United States Patent
Eckel et al.

(10) Patent No.: US 6,596,794 B1
(45) Date of Patent: Jul. 22, 2003

(54) FLAME-RESISTANT POLYCARBONATE ABS MOULDING MATERIAL

(75) Inventors: Thomas Eckel, Dormagen (DE); Michael Zobel, Köln (DE); Bernd Keller, Geldern (DE); Dieter Wittmann, Leverkusen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/856,006

(22) PCT Filed: Nov. 4, 1999

(86) PCT No.: PCT/EP99/08411
§ 371 (c)(1),
(2), (4) Date: May 16, 2001

(87) PCT Pub. No.: WO00/31173
PCT Pub. Date: Jun. 2, 2000

(30) Foreign Application Priority Data

Nov. 18, 1998 (DE) .......................... 198 53 105

(51) Int. Cl.⁷ .............................. C08K 5/523
(52) U.S. Cl. ................. 524/123; 524/125; 524/127; 524/139; 524/140; 524/141; 524/142; 524/144; 524/145
(58) Field of Search ................. 524/123, 125, 524/127, 139, 140, 141, 142, 144, 145

(56) References Cited

U.S. PATENT DOCUMENTS

| 5,061,752 A | 10/1991 | Buysch et al. ............... 525/64 |
| 5,204,394 A | 4/1993 | Gosens et al. ............... 524/125 |
| 5,627,228 A * | 5/1997 | Kobayashi ................. 524/127 |
| 5,679,759 A | 10/1997 | Wittmann et al. .......... 528/196 |
| RE36,188 E | 4/1999 | Gosens et al. ............. 524/125 |

FOREIGN PATENT DOCUMENTS

| EP | 0 755 977 | 1/1977 |
| EP | 0 933 396 | 8/1999 |
| WO | 99/07778 | 2/1999 |
| WO | 99/07791 | 2/1999 |

OTHER PUBLICATIONS

Patent Abstracts of Japan, vol. 2000, No. 02, Feb. 29, 2000, & JP 11 302523 A (Qimei Ind Co. Ltd), Nov. 2, 1999.
Database WPI, Section Ch, Week 199719, Derwent Publications Ltd., London, GB; Class A18, AN 1997–209482, XP002139568 & JP 09 059464 A (Toray Ind Inc.) Mar. 4, 1997.

* cited by examiner

Primary Examiner—Kriellion A. Sanders
(74) Attorney, Agent, or Firm—Joseph C. Gil; Aron Preis

(57) ABSTRACT

Thermoplastic moulding compositions based on polycarbonate and/or polyester-carbonate comprising graft polymer prepared by means of bulk, solution or bulk-suspension polymerization processes and phosphorus compounds of the general formula (I)

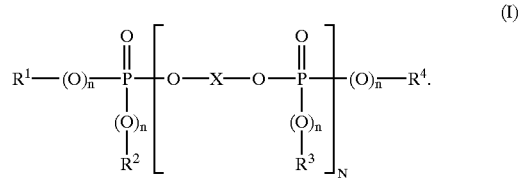

20 Claims, No Drawings

FLAME-RESISTANT POLYCARBONATE ABS MOULDING MATERIAL

The present invention relates to polycarbonate-ABS moulding compositions which have been given a flame-resistant treatment with phosphorus compounds and have an excellent profile of mechanical properties, in particular a significantly improved elongation at break, an outstanding modulus of elasticity in tension and excellent processing properties.

EP-A-0 363 608 describes polymer mixtures of aromatic polycarbonate, styrene-containing copolymer or graft copolymer and oligomeric phosphates as flameproofing additives. The profile of mechanical properties and the processing properties of these mixtures are often inadequate for particular intended purposes.

EP-A-0 704 488 describes moulding compositions of aromatic polycarbonate, styrene-containing copolymers and graft polymers with a specific graft base in particular ratios of amounts. These moulding compositions have a very good notched impact strength and can optionally be given a flame-resistant treatment with phosphorus compounds. The profile of properties is inadequate for the production of shaped articles of increased elasticity requirements and the required processing properties.

U.S. Pat. No. 5,061,745 describes moulding compositions of aromatic polycarbonate, graft polymer and monophosphates. The volatility of the monophosphates can cause severe impairment of the processing properties.

EP-A 755 977 describes moulding compositions of aromatic polycarbonate, ABS graft polymers with a rubber content of <25% and oligomeric phosphates. To obtain good stress cracking properties, the phosphate contents should not exceed 8 wt. %. It is furthermore stated that bulk ABS and mixtures of graft polymer of high rubber content and SAN resin have similar mechanical and rheological properties. To achieve adequate flameproofing, the amount of flameproofing agent employed of max. 8 wt. % may be too low.

The object of the present invention is to provide flame-resistant polycarbonate ABS moulding compositions which combine excellent mechanical properties, such as weld seam strength and elongation at break, with excellent processing properties (few surface defects, flowability, low contents of volatile components). This profile of properties corresponds to the trend towards ever thinner and therefore more light-weight components of housings.

It has now been found that PC/ABS moulding compositions which comprise phosphorus compounds according to component D (see below) and graft polymer obtainable by bulk polymerization can be processed to shaped articles having a very good profile of mechanical properties.

The present invention therefore provides flame-resistant thermoplastic moulding compositions based on polycarbonate and/or polyester-carbonate comprising graft polymer prepared by means of bulk, solution or bulk-suspension polymerization processes and, as flameproofing agents, phosphorus-containing compounds. The phosphorus compounds of the general formula (I) mentioned below as component D are employed as the phosphorus-containing compounds.

The present invention preferably provides flame-resistant thermoplastic moulding compositions comprising A. 40 to 99, preferably 60 to 98.5 parts by wt. aromatic polycarbonate and/or polyester-carbonate, B. 0.5 to 60, preferably 1 to 40, in particular 2 to 25 parts by wt. graft polymer, prepared by means of bulk, solution or bulk-suspension polymerization processes, of B.1 50 to 99, preferably 65 to 98 wt. % of one or more vinyl monomers on B.2 50 to 1, preferably 35 to 2 wt. % of one or more graft bases having a glass transition temperature of <10° C., preferably <0° C., particularly preferably <−10° C., C. 0 to 45, preferably 0 to 30, particularly preferably 2 to 25 parts by wt. thermoplastic vinyl (co)polymer and/or polyalkylene terephthalate D. 0.5 to 20 parts by wt., preferably 1 to 18 parts by wt., particularly preferably 2 to 17 parts by wt. phosphorus compound of the general formula (I)

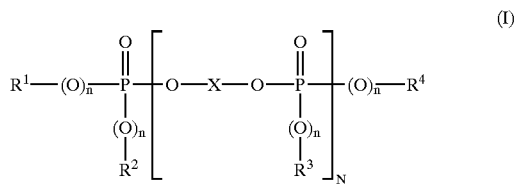

wherein $R^1$, $R^2$, $R^3$ and $R^4$ independently of one another each denote optionally halogenated $C_1$- to $C_8$-alkyl, or $C_5$- to $C_6$-cycloalkyl, $C_6$- to $C_{20}$-aryl or $C_7$- to $C_{12}$-aralkyl, in each case optionally substituted by alkyl, preferably $C_1$–$C_4$-alkyl, and/or halogen, preferably chlorine or bromine, n independently of one another denote 0 or 1

N denotes 0 to 30 and

X denotes a mono or polynuclear aromatic radical having 6 to 30 C atoms,

E. 0.05 to 5 parts by wt., preferably 0.1 to 1 part by wt., particularly preferably 0.1 to 0.5 part by wt. fluorinated polyolefin.

Component A

Aromatic polycarbonates and/or aromatic polyester-carbonates according to component A which are suitable according to the invention are known from the literature or can be prepared by processes known from the literature (for the preparation of aromatic polycarbonates see, for example, Schnell, "Chemistry and Physics of Polycarbonates", Interscience Publishers, 1964 and DE-AS 1 495 626, DE-OS 2 232 877, DE-OS 2 703 376, DE-OS 2 714 544, DE-OS 3 000 610, and DE-OS 3 832 396; for the preparation of aromatic polyester-carbonates e.g. DE-OS 3 077 934).

Aromatic polycarbonates are prepared e.g. by reaction of diphenols with carbonic acid halides, preferably phosgene, and/or with aromatic dicarboxylic acid dihalides, preferably benzenedicarboxylic acid dihalides, by the phase boundary process, optionally using chain stoppers, for example monophenols, and optionally using branching agents which are trifunctional or more than trifunctional, for example triphenols or tetraphenols.

Diphenols for the preparation of the aromatic polycarbonates and/or aromatic polyester-carbonates are preferably those of the formula (II)

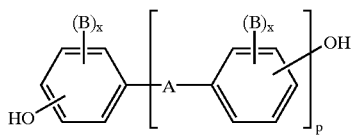

(II)

wherein

A is a single bond, $C_1$–$C_5$-alkylene, $C_2$–$C_5$-alkylidene, $C_5$–$C_6$-cycloalkylidene, —O—, —SO—, —CO—, —S—, $SO_2$— or $C_6$–$C_{12}$-arylene, to which further aromatic rings optionally containing heteroatoms can be fused, or a radical of the formula (III) or (IV)

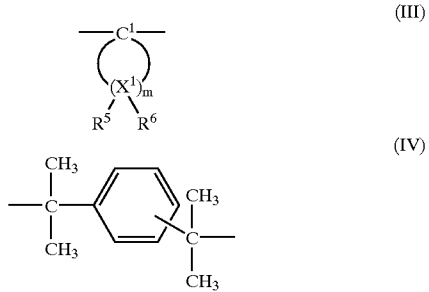

B in each case is hydrogen, $C_1$–$C_{12}$-alkyl, preferably methyl, or halogen, preferably chlorine and/or bromine, x in each case independently of one another is 0, 1 or 2, p is 1 or 0 and $R^5$ and $R^6$ can be chosen individually for each $X^1$ and independently of one another denote hydrogen or $C_1$–$C_6$-alkyl, preferably hydrogen, methyl or ethyl, $X^1$ denotes carbon and m denotes an integer from 4 to 7, preferably 4 or 5, with the proviso that on at least one atom $X^1$, $R^5$ and $R^6$ are simultaneously alkyl.

Preferred diphenols are hydroquinone, resorcinol, dihydroxydiphenols, bis-(hydroxyphenyl)-$C_1$–$C_5$-alkanes, bis-(hydroxyphenyl)-$C_5$–$C_6$-cycloalkanes, bis-(hydroxyphenyl) ethers, bis-(hydroxyphenyl) sulfoxides, bis-(hydroxyphenyl) ketones, bis(hydroxyphenyl) sulfones and α,α-bis-(hydroxyphenyl)-diisopropyl-benzenes and derivatives thereof brominated on the nucleus and/or chlorinated on the nucleus.

Particularly preferred diphenols are 4,4'-dihydroxydiphenyl, bisphenol A, 2,4-bis(4-hydroxyphenyl)-2-methylbutane, 1,1-bis-(4-hydroxyphenyl)-cyclohexane, 1,1-bis(4-hydroxyphenyl)-3,3,5-trimethylcyclohexane, 4,4'-dihydroxydiphenyl sulfide, 4,4'-dihydroxydiphenyl sulfone and di- and tetrabrominated or -chlorinated derivatives thereof, such as, for example, 2,2-bis(3-chloro-4-hydroxyphenyl)-propane, 2,2-bis-(3,5-dichloro-4-hydroxyphenyl)-propane or 2,2-bis-(3,5-dibromo-4-hydroxyphenyl)-propane.

2,2-Bis-(4-hydroxyphenyl)-propane (bisphenol A) is particularly preferred.

The diphenols can be employed individually or as any desired mixtures.

The diphenols are known from the literature or obtainable by processes known from the literature.

Examples of chain stoppers which are suitable for the preparation of the thermoplastic, aromatic polycarbonates are phenol, p-chlorophenol, p-tert-butylphenol or 2,4,6-tribromophenol, and also long-chain alkylphenols, such as 4-(1,3-tetramethylbutyl)-phenol according to DE-OS 2 842 005, or monoalkylphenols or dialkylphenols having a total of 8 to 20 C atoms in the alkyl substituents, such as 3,5-di-tert-butyl-phenol, p-iso-octylphenol, p-tert-octylphenol, p-dodecylphenol and 2-(3,5-dimethylheptyl)-phenol and 4-(3,5-dimethylheptyl)-phenol. The amount of chain stoppers to be employed is in general between 0.5 mol % and 10 mol %, based on the molar sum of the particular diphenols employed.

The thermoplastic, aromatic polycarbonates have average weight-average molecular weights ($M_w$, measured e.g. by ultracentrifuge or scattered light measurement) of 10,000 to 200,000, preferably 20,000 to 80,000.

The thermoplastic, aromatic polycarbonates can be branched in a known manner, and in particular preferably by incorporation of 0.05 to 2.0 mol %, based on the sum of the diphenols employed, of compounds which are trifunctional or more than trifunctional, for example those with three or more phenolic groups.

Both homopolycarbonates and copolycarbonates are suitable. To prepare copolycarbonates according to the invention according to component A, it is also possible to employ 1 to 25 wt. %, preferably 2.5 to 25 wt. % (based on the total amount of diphenols to be employed) of polydiorganosiloxanes with hydroxyaryloxy end groups. These are known (see, for example, U.S. Pat. No. 3,419,634) or can be prepared by processes known from the literature. The preparation of copolycarbonates containing polydiorganosiloxane is described e.g. in DE-OS 3 334 782.

Preferred polycarbonates are, in addition to bisphenol A homopolycarbonates, the copolycarbonates of bisphenol A with up to 15 mol %, based on the molar sum of diphenols, of other diphenols mentioned as preferred or particularly preferred, in particular 2,2-bis(3,5-dibromo-4-hydroxyphenyl)-propane.

Aromatic dicarboxylic acid dihalides for the preparation of aromatic polyester-carbonates are preferably the diacid dichlorides of isophthalic acid, terephthalic acid, diphenyl ether-4,4'-dicarboxylic acid and of naphthalene-2,6-dicarboxylic acid.

Mixtures of the diacid dichlorides of isophthalic acid and of terephthalic acid in a ratio of between 1:20 and 20:1 are particularly preferred.

A carbonic acid halide, preferably phosgene, is additionally co-used as a bifunctional acid derivative in the preparation of polyester-carbonates.

Possible chain stoppers for the preparation of the aromatic polyester-carbonates are, in addition to the monophenols already mentioned, also chlorocarbonic acid esters thereof, and the acid chlorides of aromatic monocarboxylic acids, which can optionally be substituted by $C_1$–$C_{22}$-alkyl groups or by halogen atoms, as well as aliphatic $C_2$–$C_{22}$-monocarboxylic acid chlorides.

The amount of chain stoppers is in each case 0.1 to 10 mol %, based on the moles of diphenols in the case of the phenolic chain stoppers and on the moles of dicarboxylic acid dichlorides in the case of monocarboxylic acid chloride chain stoppers.

The aromatic polyester-carbonates can also contain incorporated aromatic hydroxycarboxylic acids.

The aromatic polyester-carbonates can be both linear and branched in a known manner (in this context see likewise DE-OS 2 940 024 and DE-OS 3 007 934).

Branching agents which can be used are, for example, carboxylic acid chlorides which are 3-functional or more than 3-functional, such as trimesic acid trichloride, cyanuric acid trichloride, 3,3',4,4'-benzophenone-tetracarboxylic acid tetrachloride, 1,4,5,8-naphthalenetetracarboxylic acid tetrachloride or pyromellitic acid tetrachloride, in amounts of 0.01 to 1.0 mol % (based on the dicarboxylic acid dichlorides employed) or phenols which are 3-functional or more than 3-functional, such as phloroglucinol, 4,6-dimethyl-2,4, 6-tri-(4-hydroxyphenyl)-hept-2-ene, 4,4-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis[4,4-bis(4-hydroxyphenyl)-cyclohexyl]-propane, 2,4-bis(4-hydroxyphenyl-isopropyl)-phenol, tetra-(4-hydroxyphenyl)-methane, 2,6-bis(2-hydroxy-5-methyl-benzyl)-4-methyl-phenol, 2-(4-hydroxyphenyl)-2-(2,4-dihydroxyphenyl)-propane, tetra-(4-[4-hydroxyphenyl-isopropyl]-phenoxy)-methane and 1,4-bis[4,4'-dihydroxytriphenyl)-methyl]-benzene, in amounts of 0.01 to 1.0 mol %, based on the diphenols employed. Phenolic branching agents can be initially introduced into the reaction vessel with the diphenols, and acid chloride branching agents can be introduced together with the acid dichlorides.

The content of carbonate structural units in the thermoplastic, aromatic polyester-carbonates can vary as desired. The content of carbonate groups is preferably up to 100 mol %, in particular up to 80 mol %, particularly preferably up to 50 mol %, based on the sum of ester groups and carbonate groups. Both the ester and the carbonate content of the aromatic polyester-carbonates can be in the form of blocks or randomly distributed in the polycondensate.

The relative solution viscosity ($\eta_{rel}$) of the aromatic polycarbonates and the aromatic polyester-carbonates is in the range from 1.18 to 1.4, preferably 1.22 to 1.3 (measured on solutions of 0.5 g polycarbonate or polyester-carbonate in 100 ml methylene chloride solution at 25° C.).

The thermoplastic, aromatic polycarbonates and polyester-carbonates can be employed by themselves or in any desired mixture with one another.

Component B

The rubber-modified graft polymer B comprises a random (co)polymer of monomers according to B.1.1 and/or B.1.2 and a rubber B.2 grafted with the random (co)polymer of B.1.1 and/or B.1.2, the preparation of B being carried out in a known manner by a bulk or solution or bulk-suspension polymerization process, such as are described e.g. in U.S. Pat. No. 3,243,481, U.S. Pat. No. 3,509,237, U.S. Pat. No. 3,660,535, U.S. Pat. No. 4,221,833 and U.S. Pat. No. 4,239,863.

Examples of monomers B.1.1 are styrene, α-methylstyrene, styrenes substituted on the nucleus by halogen or alkyl, such as p-methylstyrene and p-chlorostyrene, and (meth)acrylic acid $C_1$–$C_8$-alkyl esters, such as methyl methacrylate, n-butyl acrylate and t-butyl acrylate. Examples of monomers B.1.2 are unsaturated nitriles, such as acrylonitrile and methacrylonitrile, (meth)acrylic acid $C_1$–$C_8$-alkyl esters, such as methyl methacrylate, n-butyl acrylate and t-butyl acrylate, and derivatives (such as anhydrides and imides) of unsaturated carboxylic acids, such as maleic anhydride and N-phenyl-maleimide or mixtures thereof.

Preferred monomers B.1.1 are styrene, α-methylstyrene and/or methyl methacrylate, and preferred monomers B.1.2 are acrylonitrile, maleic anhydride and/or methyl methacrylate.

Particularly preferred monomers are B.1.1 styrene and B.1.2 acrylonitrile.

Rubbers B.2 which are suitable for the rubber-modified graft polymers B are, for example, diene rubbers, EP(D)M rubbers, that is to say those based on ethylene/propylene and optionally diene, and acrylate, polyurethane, silicone, chloroprene and ethylene/vinyl acetate rubbers.

Preferred rubbers B.2 are diene rubbers (e.g. based on butadiene, isoprene etc.) or mixtures of diene rubbers or copolymers of diene rubbers or mixtures thereof with further copolymerizable monomers (e.g. according to B.1.1 and B.1.2), with the proviso that the glass transition temperature of component B.2. is below 10° C., preferably below −10° C. Pure polybutadiene rubber is particularly preferred.

If necessary and if the rubber properties of component B.2 are not thereby impaired, component B can additionally also comprise small amounts, usually less than 5 wt. %, preferably less than 2 wt. %, based on B.2, of ethylenically unsaturated monomers which have a crosslinking effect. Examples of such monomers having a crosslinking effect are alkylene diol di-(meth)acrylates, polyester di-(meth)acrylates, divinylbenzene, trivinylbenzene, triallyl cyanurate, allyl (meth)acrylate, diallyl maleate and diallyl fumarate.

The rubber-modified graft polymer B is obtained by grafting polymerization of 50 to 99, preferably 65 to 98, particularly preferably 75 to 95 parts by wt. of a mixture of 50 to 99, preferably 60 to 95 parts by wt. monomers according to B.1.1 and 1 to 50, preferably 5 to 40 parts by wt. monomers according to B.1.2 in the presence of 1 to 50, preferably 2 to 35, particularly preferably 5 to 25 parts by wt. rubber component B.2, the grafting polymerization being carried out by a bulk or solution or bulk-suspension polymerization process.

In the preparation of the rubber-modified graft polymers B, it is essential that rubber component B.2 is in dissolved form before the grafting polymerization in the mixture of monomers B.1.1 and/or B.1.2. Rubber component B.2 therefore must not be so highly crosslinked that a solution in B.1.1 and/or B.1.2 becomes impossible, nor must B.2. already be in the form of discrete particles at the start of the grafting polymerization. The particle morphology and increasing crosslinking of B.2 which are important for the product properties of B develop only in the course of the grafting polymerization (in this context see, for example, Ullmann, Encyclopädie der technischen Chemie, volume 19, p. 284 et seq., 4th edition 1980).

A part of the random copolymer of B.1.1 and B.1.2 is usually present in polymer B grafted on or into rubber B.2, this graft copolymer forming discrete particles in polymer B. The content in the total copolymer of B.1.1 and B.1.2 of the grafted-on or—in copolymer of B.1.1 and B.1.2—that is to say the grafting yield (=weight ratio between the grafting monomer actually grafted and the total grafting monomers used×100, stated in %)—should here be 2 to 40%, preferably 3 to 30%, particularly preferably 4 to 20%.

The average particle diameter of the resulting grafted rubber particles (determined by counting on electron microscopy photographs) is in the range from 0.5 to 5 µm, preferably 0.8 to 2.5 µm.

In addition to the graft polymers prepared by bulk polymerization, the moulding compositions according to the invention can also comprise graft polymer prepared by emulsion polymerization. The description of the graft polymers preferably corresponds to that of those prepared by bulk polymerization, but they are prepared by means of emulsion polymerization.

The average particle diameter ($d_{50}$ value) of the graft base in the emulsion graft polymer is in general 0.05 to 5 µm, preferably 0.10 to 0.5 μm, particularly preferably 0.20 to 0.40 μm. The gel content of the graft base is at least 30 wt. %, preferably at least 40 wt. %.

The ABS graft polymer is particularly preferably an "emulsion graft polymer".

The weight ratio of graft polymer according to component B of the present invention prepared by means of bulk polymerization to graft polymer prepared by means of emulsion polymerization is 100:0 to 50:50, preferably 80:20 to 60:40.

Component C

Component C comprises one or more thermoplastic vinyl (co)polymers C.1 and/or polyalkylene terephthalates C.2.

Suitable vinyl (co)polymers C.1 are polymers of at least one monomer from the group consisting of vinylaromatics, vinyl cyanides (unsaturated nitriles), (meth)acrylic acid ($C_1$–$C_8$)-alkyl esters, unsaturated carboxylic acids and derivatives (such as anhydrides and imides) of unsaturated carboxylic acids. Particularly suitable (co)polymers are those of C.1.1 50 to 99, preferably 60 to 80 parts by wt. vinylaromatics and/or vinylaromatics substituted on the nucleus (such as, for example, styrene, α-methylstyrene, p-methylstyrene and p-chlorostyrene) and/or methacrylic acid ($C_1$–$C_8$)-alkyl esters (such as e.g. methyl methacrylate and ethyl methacrylate), and C.1.2 1 to 50, preferably 20 to 40 parts by wt. vinyl cyanides (unsaturated nitriles), such as acrylonitrile and methacrylonitrile, and/or (meth)acrylic acid ($C_1$–$C_8$)-alkyl esters (such as e.g. methyl methacrylate, n-butyl acrylate and t-butyl acrylate) and/or unsaturated carboxylic acids (such as maleic acid) and/or derivatives (such as anhydrides and imides) of unsaturated carboxylic acids (for example maleic anhydride and N-phenyl-maleimide).

(Co)polymers C.1 are resinous, thermoplastic and rubber-free.

The copolymer of C.1.1 styrene and C.1.2 acrylonitrile is particularly preferred.

(Co)polymers according to C.1 are known and can be prepared by free-radical polymerization, in particular by emulsion, suspension, solution or bulk polymerization. The (co)polymers preferably have molecular weights $\overline{M}_w$ (weight-average, determined by light scattering or sedimentation) of between 15,000 and 200,000.

The polyalkylene terephthalates of component C.2 are reaction products of aromatic dicarboxylic acids or their reactive derivatives, such as dimethyl esters or anhydrides, and aliphatic, cycloaliphatic or araliphatic diols, and mixtures of these reaction products.

Preferred polyalkylene terephthalates contain at least 80 wt. %, preferably at least 90 wt. %, based on the dicarboxylic acid component, of terephthalic acid radicals and at least 80 wt. %, preferably at least 90 wt. %, based on the diol component, of ethylene glycol radicals and/or butane-1,4-diol radicals.

Preferred polyalkylene terephthalates can contain, in addition to terephthalic acid radicals, up to 20 mol %, preferably up to 10 mol %, of radicals of other aromatic or cycloaliphatic dicarboxylic acids having 8 to 14 C atoms or aliphatic dicarboxylic acids having 4 to 12 C atoms, such as e.g. radicals of phthalic acid, isophthalic acid, naphthalene-2,6-dicarboxylic acid, 4,4'-diphenyldicarboxylic acid, succinic acid, adipic acid, sebacic acid, azelaic acid and cyclohexane-diacetic acid.

In addition to ethylene glycol radicals or butane-1,4-diol radicals, the preferred polyalkylene terephthalates can contain up to 20 mol %, preferably up to 10 mol % of other aliphatic diols having 3 to 12 C atoms or cycloaliphatic diols having 6 to 21 C atoms, e.g. radicals of propane-1,3-diol, 2-ethylpropane-1,3-diol, neopentylglycol, pentane-1,5-diol, hexane-1,6-diol, cyclohexane-1,4-dimethanol, 3-ethylpentane-2,4-diol, 2-methylpentane-2,4-diol, 2,2,4-trimethylpentane-1,3-diol, 2-ethylhexane-1,3-diol, 2,2-diethylpropane-1,3-diol, hexane-2,5-diol, 1,4-di-(β-hydroxyethoxy)-benzene, 2,2-bis-(4-hydroxycyclohexyl) propane, 2,4-dihydroxy-1,1,3,3-tetramethyl-cyclobutane, 2,2-bis-(4-6-hydroxyethoxy-phenyl)-propane and 2,2-bis-(4-hydroxypropoxyphenyl)-propane (DE-OS 2 407 674, 2 407 776 and 2 715 932).

The polyalkylene terephthalates can be branched by incorporation of relatively small amounts of 3- or 4-hydric alcohols or 3- or 4-basic carboxylic acids, e.g. in accordance with DE-OS 1 900 270 and U.S. Pat. No. 3,692,744. Examples of preferred branching agents are trimesic acid, trimellitic acid, trimethylolethane and -propane and pentaerythritol.

Particularly preferred polyalkylene terephthalates are those which have been prepared solely from terephthalic acid and reactive derivatives thereof (e.g. dialkyl esters thereof) and ethylene glycol and/or butane-1,4-diol, and mixtures of these polyalkylene terephthalates.

Mixtures of polyalkylene terephthalates comprise 1 to 50 wt. %, preferably 1 to 30 wt. % polyethylene terephthalate and 50 to 99 wt. %, preferably 70 to 99 wt. % polybutylene terephthalate.

The polyalkylene terephthalates preferably used in general have an intrinsic viscosity of 0.4 to 1.5 dl/g, preferably 0.5 to 1.2 dl/g, measured in phenol/o-dichlorobenzene (1:1 parts by weight) at 25° C. in an Ubbelohde viscometer.

The polyalkylene terephthalates can be prepared by known methods (see e.g. Kunststoff-Handbuch, volume VIII, p. 695 et seq., Carl-Hanser-Verlag, Munich 1973).

Component D

Component D is a phosphorus compound of the formula (I)

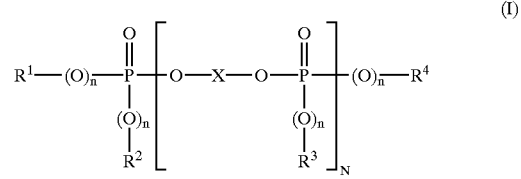

In the formula, $R^1$, $R^2$, $R^3$ and $R^4$ have the abovementioned meanings. Preferably, $R^1$, $R^2$, $R^3$ and $R^4$ independently of one another represent $C_1$–$C_4$-alkyl, phenyl, naphthyl or phenyl-$C_1$–$C_4$-alkyl. The aromatic groups $R^1$, $R^2$, $R^3$ and $R^4$ can in turn be substituted by halogen and/or alkyl groups, preferably chlorine, bromine and/or $C_1$–$C_4$-alkyl. Particularly preferred aryl radicals are cresyl, phenyl, xylenyl, propylphenyl or butylphenyl and the corresponding brominated and chlorinated derivatives thereof.

X in the formula (I) denotes a mono- or polynuclear aromatic radical having 6 to 30 C atoms. This is derived from diphenols of the formula (II). Preferred diphenols are e.g. diphenylphenol, bisphenol A, resorcinol or hydroquinone or chlorinated or brominated derivatives thereof.

n in the formula (I) independently of one another can be 0 or 1, and n is preferably 1.

N represents values from 0 to 30, preferably an average value of 0.3 to 20, particularly preferably 0.5 to 10, in particular 0.5 to 6.

Compounds of the formula (Ia)

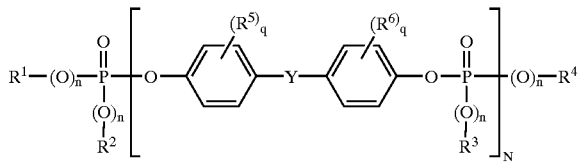

(Ia)

wherein $R^1$, $R^2$, $R^3$ and $R^4$, n and N have the meaning given above in the case of formula (I), $R^5$ and $R^6$ independently of one another denote $C_1$–$C_4$ alkyl, preferably methyl, or halogen, preferably chlorine and/or bromine, Y denotes $C_1$–$C_7$-alkylidene, $C_1$–$C_7$-alkylene, $C_5$–$C_{12}$-cycloalkylene, $C_5$–$C_{12}$-cycloalkylidene, —O—, —S—, —SO— or —CO— and q denotes 0 or the number 1 or 2, and Y preferably represents $C_1$–$C_7$-alkylidene, in particular isopropylidene, or methylene are furthermore also a preferred phosphorus compound.

In the formula (Ia), the group

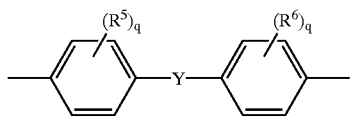

corresponds to the radical X in formula (I).

Monophosphates (N=0), oligophosphates (N=1–30) or mixtures of mono- and oligophosphates can be employed as component D according to the invention.

Component D is preferably present in the moulding compositions according to the invention as a mixture of 10 to 90 wt. %, preferably 12 to 40 wt. % of at least one monophosphorus compound of the formula (I) and 10 to 90 wt. %, preferably 60 to 88 wt. %, in each case based on the total amount of phosphorus compounds, of at least one oligophosphorus compound of the formula (I), the mixture having an average N of 0.3 to 20, preferably 0.5 to 10, particularly preferably 0.5 to 6.

Monophosphorus compounds of the formula (I) are, in particular, tributyl phosphate, tris-(2-chloroethyl) phosphate, tris-(2,3-dibromopropyl) phosphate, triphenyl phosphate, tricresyl phosphate, diphenyl cresyl phosphate, diphenyl octyl phosphate, diphenyl 2-ethylcresyl phosphate, tri-(isopropylphenyl) phosphate, halogen-substituted aryl phosphates, methylphosphonic acid dimethyl ester, methylphosphonic acid diphenyl ester, phenylphosphonic acid diethyl ester, triphenylphosphine oxide or tricresylphosphine oxide.

For certain applications, especially if increased flame resistance requirements are imposed, contents of phosphorus compounds D of more than 8 wt. %, preferably of 8.5 to 17 parts by wt. are necessary.

The phosphorus compounds according to component D are known (cf. e.g. EP-A 363 608 and EP-A 640 655), or they can be prepared in a manner analogous to known methods (e.g. Ullmanns Encyklopädie der technischen Chemie, vol. 18, p. 301 et seq. 1979; Houben-Weyl, Methoden der organischen Chemie, vol. 12/1, p. 43; Beilstein vol. 6, p. 177).

Component E

The fluorinated polyolefins E are of high molecular weight and have glass transition temperatures above −30° C., as a rule above 100° C., fluorine contents preferably of 65 to 76, in particular 70 to 76 wt. % and average particle diameters $d_{50}$ of 0.05 to 1,000, preferably 0.08 to 20 µm. In general, the fluorinated polyolefins E have a density of 1.2 to 2.3 g/cm³. Preferred fluorinated polyolefins E are polytetrafluoroethylene, polyvinylidene fluoride and tetrafluoroethylene/hexa-fluoropropylene and ethylene/tetrafluoroethylene copolymers. The fluorinated polyolefins are known (cf. "Vinyl and Related Polymers" by Schildknecht, John Wiley & Sons, Inc., New York, 1962, pages 484–494; "Fluorpolymers" by Wall, Wiley-Interscience, John Wiley & Sons, Inc., New York, volume 13, 1970, pages 623–654; "Modern Plastics Encyclopaedia", 1970–1971, volume 47, no. 10 A, October 1970, McGraw-Hill, Inc., New York, pages 134 and 774; "Modern Plastics Encyclopaedia", 1975–1976, October 1975, volume 52, no. 10 A, McGraw-Hill, Inc., New York, pages 27, 28 and 472 and U.S. Pat. Nos. 3,671,487, 3,723,373 and 3,838,092).

They can be prepared by known processes, thus, for example, by polymerization of tetrafluoroethylene in an aqueous medium with a catalyst which forms free radicals, for example sodium peroxydisulfate, potassium peroxydisulfate or ammonium peroxydisulfate, under pressures of 7 to 71 kg/cm² and at temperatures of 0 to 200° C., preferably at temperatures of 20 to 100° C. (For further details see e.g. U.S. Pat. No. 2,393,967). Depending on the use form, the density of these materials can be between 1.2 and 2.3 g/cm³ and the average particle size can be between 0.5 and 1,000 µm.

Fluorinated polyolefins E which are preferred according to the invention are tetrafluoroethylene polymers with average particle diameters of 0.05 to 20 µm, preferably 0.08 to 10 µm, and a density of 1,2 to 1,9 g/cm³, and are preferably employed in the form of a coagulated mixture of emulsions of the tetrafluoroethylene polymers E with emulsions of the graft polymers B.

Suitable fluorinated polyolefins E which can be employed in powder form are tetrafluoroethylene polymers with average particle diameters of 100 to 1,000 µm and densities of 2.0 g/cm³ to 2.3 g/cm³.

To prepare a coagulated mixture of B and E, an aqueous emulsion (latex) of a graft polymer B is first mixed with a finely divided emulsion of a tetraethylene polymer E; suitable tetrafluoroethylene polymer emulsions usually have solids contents of 30 to 70 wt. %, in particular 50 to 60 wt. %, preferably 30 to 35 wt. %.

The amounts stated in the description of component B can include the content of the graft polymer for the coagulated mixture of graft polymer and fluorinated polyolefins.

The equilibrium ratio of graft polymer B to tetrafluoroethylene polymer E in the emulsion mixture is 95:5 to 60:40. The emulsion mixture is then coagulated in a known manner, for example by spray drying, freeze drying or coagulation by means of addition of inorganic or organic salts, acids or bases or organic water-miscible solvents, such as alcohols or ketones, preferably at temperatures of 20 to 150° C., in particular 50 to 100° C. If necessary, the product can be dried at 50 to 200° C., preferably 70 to 100° C.

Suitable tetrafluoroethylene polymer emulsions are commercially available products and are available, for example, as Teflon® 30 N from DuPont.

The moulding compositions according to the invention can comprise at least one of the conventional additives, such as lubricants and mould release agents, nucleating agents, antistatics, stabilizers and dyestuffs and pigments.

The moulding compositions according to the invention can furthermore also comprise very finely divided inorganic powders in an amount of up to 50 parts by wt., preferably up to 20, in particular 0.5 to 10 parts by wt.

Very finely divided inorganic compounds are compounds of one or more metals of main groups 1 to 5 or sub-groups 1 to 8 of the periodic table, preferably main groups 2 to 5 or sub-groups 4 to 8, particularly preferably main groups 3 to 5 or sub-groups 4 to 8, with at least one element chosen from the group consisting of oxygen, sulphur, boron, phosphorus, carbon, nitrogen, hydrogen and silicon.

Preferred compounds are, for example, oxides, hydroxides, water-containing oxides, sulfates, sulfites, sulfides, carbonates, carbides, nitrates, nitrites, nitrides, borates, silicates, phosphates, hydrides, phosphites or phosphonates.

Preferred very finely divided inorganic compounds are, for example, TiN, $TiO_2$, $SnO_2$, WC, ZnO, $Al_2O_3$, AlO(OH), $ZrO_2$, $Sb_2O_3$, SiO2, iron oxides, $Na_2SO_4 BaSO_4$, vanadium oxides, zinc borate and silicates, such as Al silicates, Mg silicates and one-, two- and three-dimensional silicates. Mixtures and doped compounds can also be used. These nanoscale particles can moreover be modified on the surface with organic molecules, in order to achieve a better compatibility with the polymers. Hydrophobic or hydrophilic surfaces can be produced in this manner.

The average particle diameters are less than 200 nm, preferably less than 150 nm, in particular 1 to 100 nm.

Particle size and particle diameter always means average particle diameter $d_{50}$, determined by ultracentrifuge measurements by the method of W. Scholtan et al. Kolloid-Z. und Z. Polymere 250 (1972), p. 782 to 796.

The inorganic compounds can be in the form of powders, pastes, sols, dispersions or suspensions. Powders can be obtained by precipitation from dispersions, sols or suspensions.

The powders can be incorporated into the thermoplastics by conventional processes, for example by direct kneading or extrusion of the constituents of the moulding composition and the very finely divided inorganic powders. Preferred processes are the preparation of a masterbatch, e.g. in flameproofing additives, other additives, monomers, solvents, in component A or co-precipitation of dispersions of the graft rubbers with dispersions, suspensions, pastes or sols of the very finely divided inorganic materials.

The moulding compositions according to the invention can comprise up to 35 wt. %, based on the total moulding composition, of a further flameproofing agent which optionally has a synergistic action. Further flameproofing agents which are mentioned by way of example are organic halogen compounds, such as decabromobisphenyl ether and tetrabromobisphenol, inorganic halogen compounds, such as ammonium bromide, nitrogen compounds, such as melamine and melamine-formaldehyde resins, inorganic hydroxide compounds, such as Mg and Al hydroxide, and inorganic compounds, such as antimony oxides, barium metaborate, hydroxoantimonate, zirconium oxide, zirconium hydroxide, molybdenum oxide, ammonium molybdate, zinc borate, ammonium borate and tin oxide, as well as siloxane compounds.

The moulding compositions according to the invention comprising components A to E and optionally further known additives, such as stabilizers, dyestuffs, pigments, lubricants and mould release agents, nucleating agents and antistatics, are prepared by mixing the particular constituents in a known manner and subjecting the mixture to melt compounding and melt extrusion at temperatures of 200° C. to 300° C. in conventional units, such as internal kneaders, extruders and twin-screw extruders, component E preferably being employed in the form of the coagulated mixture already mentioned.

Mixing of the individual constituents can be carried out in a known manner both successively and simultaneously, and in particular both at about 20° C. (room temperature) and at a higher temperature.

On the basis of their excellent flame resistance, their very good processing properties and their very good mechanical properties, in particular their outstanding rigidity, the thermoplastic moulding compositions according to the invention are suitable for the production of all types of shaped articles, in particular those with increased breaking resistance requirements.

The moulding compositions of the present invention can be used for the production of all types of shaped articles. In particular, shaped articles can be produced by injection moulding. Examples of shaped articles which can be produced are: housing components of all types, e.g. for domestic appliances such as juice presses, coffee machines and mixers, or for office machines, such as monitors, printers or copiers, or cover sheets for the building sector and components for the motor vehicle sector. They can furthermore be employed in the field of electrical engineering, because they have very good electrical properties.

The moulding compositions according to the invention can furthermore be used, for example, for the production of the following shaped articles or mouldings:

1. Interior fittings for railway vehicles
2. Hub caps
3. Housings for electrical equipment containing small transformers
4. Housings for equipment for data transmission and transfer
5. Housings and linings for medical purposes
6. Massage equipment and housings therefor
7. Toy vehicles for children
8. Flat wall elements
9. Housings for safety devices
10. Rear spoilers
11. Thermally insulated transportation containers
12. Devices for housing or care of small animals
13. Mouldings for sanitary and bath fittings
14. Cover gratings for ventilator openings
15. Mouldings for garden and equipment sheds
16. Housings for garden equipment.

Another form of processing is the production of shaped articles by thermoforming from previously produced sheets or films.

The present invention therefore also provides the use of the moulding compositions according to the invention for the production of all types of shaped articles, preferably those mentioned above, and the shaped articles made from the moulding compositions according to the invention.

EXAMPLES

Component A

A.1

Linear polycarbonate based on bisphenol A with a relative solution viscosity of 1.272, measured in $CH_2Cl_2$ as the solvent at 25° C. and a concentration of 0.5 g/100 ml.

A.2

Linear polycarbonate based on bisphenol A with a relative solution viscosity of 1,202, measured in $CH_2Cl_2$ as the solvent at 25° C. and a concentration of 0.5 g/100 ml.

Component B

B.1

Graft polymer of 84 parts by wt. of a copolymer of styrene and acrylonitrile in a ratio of 73:27 on 16 parts by wt. crosslinked polybutadiene rubber, prepared by bulk polymerization.

B.2 (Comparison)

Graft polymer of 40 parts by wt. of a copolymer of styrene and actylonitrile in a ratio of 73:27 on 60 parts by wt. particulate crosslinked polybutadiene rubber (average particle diameter $d_{50}=0.28$ μm), prepared by emulsion polymerization.

Component C

Styrene/acrylonitrile copolymer with a styrene/acrylonitrile weight ratio of 72:28 and a limiting viscosity of 0.55 dl/g (measurement in dimethylformamide at 20° C.).

Component D

D-1 Triphenyl phosphate (TPP) as a comparison.
D.2 Mixture of m-phenylene-bis(di-phenyl phosphate) (Fyrolflex® RDP from Akzo) and triphenyl phosphate (TPP) in a weight ratio of 3:1.
D.3 m-Phenylene-bis(di-phenyl phosphate), Fyrolflex° RDP from Akzo.

Component E

Tetrafluoroethylene polymer as a coagulated mixture of an SAN graft polymer emulsion according to the above component B in water and a tetrafluoroethylene polymer emulsion in water. The weight ratio of graft polymer B to tetrafluoroethylene polymer E in the mixture is 90 wt. % to 10 wt. %. The tetrafluoroethylene polymer emulsion has a solids content of 60 wt. %, and the average particle diameter is between 0.05 and 0.5 μm. The SAN graft polymer emulsion has a solids content of 34 wt. %, and an average latex particle diameter of $d_{50}=0.28$ μm.

Preparation of E

The emulsion of the tetrafluoroethylene polymer (Teflon 30 N from DuPont) is mixed with the emulsion of the SAN graft polymer B and the mixture is stabilized with 1.8 wt. %, based on the polymer solid, of phenolic antioxidants. The mixture is coagulated at 85 to 95° C. with an aqueous solution of $MgSO_4$ (Epsom salt) and acetic acid at pH 4 to 5 and filtered and the residue is washed until practically free from electrolytes, subsequently freed from most of the water by centrifugation and then dried to a powder at 100° C. This powder can then be compounded with the further components in the units described.

Preparation and Testing of the Moulding Compositions According to the Invention

The components are mixed on a 3 1 internal kneader. The shaped articles are produced on an injection moulding machine, type Arburg 270 E at 260° C.

The Vicat B heat distortion point is determined in accordance with DIN 53 460 (ISO 306) on bars of dimensions 80×10×4 $mm^3$.

The modulus of elasticity in tension is determined in accordance with DIN 53 457/ISO 527.

The elongation at break is determined in accordance with ISO 527.

To determine the weld seam strength, the impact strength is measured in accordance with DIN 53 453 on the weld line of test specimens of dimensions 170×10×4 mm injection-moulded on both sides (processing temperature 260° C.).

The weight loss is determined by thermogravimetric analysis (TGA) on granules. Measurement conditions: dynamic, heating rate 10 K/min. $N_2$ as the inert gas. The value at 280° C. is used as a measure of the content of volatile components and the stability during processing.

To determine the stability during processing, test specimens with dimensions of 80×10×4 $mm^3$ are furthermore produced at 260° C., 280° C. and 300° C. The stability during processing is evaluated from the quality of the surface.

TABLE

Composition and properties of the polycarbonate-ABS moulding compositions

| Example | 1 | 2 (comparison) | 3 | 4 (comparison) | 5 |
|---|---|---|---|---|---|
| Components [parts by wt.] | | | | | |
| A.1 | 69.7 | 69.7 | 48.7 | 48.7 | 42.2 |
| A.2 | — | — | 29.8 | 29.8 | 26.2 |
| B.1 | 14.3 | — | 9.5 | — | 16.1 |
| B.2 | — | 7.6 | — | 4.5 | — |
| C | — | 6.7 | — | 5.0 | — |
| D.1 | 11.3 | 11.3 | — | — | — |
| D.2 | — | — | 8.0 | 8.0 | — |
| D.3 | — | — | — | — | 10.8 |
| E | 4.2 | 4.2 | 3.6 | 3.6 | 4.2 |
| Properties | | | | | |
| Vicat B 120 [° C.] | 92 | 91 | 109 | 107 | 98 |
| $a_n$ weld seam [$kJ/m^2$] | 8.7 | 7.3 | 44.9 | 39.2 | 9.2 |
| MVR (240/5)/ ISO 1133 [$cm^3$/10 min] | 19.3 | 15.7 | 19.6 | 19.4 | 24.2 |
| UL 94 V 1.6 mm | V-0 | V-0 | V-0 | V-0 | V-0 |
| Modulus of elasticity in tension [$N/mm^3$] | 2458 | 2319 | 2657 | 2635 | 2678 |
| Elongation at break [%] | 87.5 | 55.2 | 90.5 | 43.9 | 83.4 |
| Weight loss TGA 280° C. [%] | 3.5 | 4.1 | 0.9 | 1.2 | 0.4 |
| Processing stability | | | | | |
| 260° C. | + | + | + | + | + |
| 280° C. | + | +/− | + | +/− | + |
| 300° C. | + | − | + | − | + |

The symbols mean:
+ no surface defects
+/− minor surface defects
− severe surface defects Examples 1, 3 and 5 according to the invention show clear improvements in the mechanical properties, such as elongation at break and weld seam strength, higher moduli of elasticity and a significantly higher stability during processing, which manifests itself in a reduced weight loss at 280° C. (TGA) and fewer surface defects on the test specimens. The polycarbonate-ABS moulding compositions which comprise both bulk ABS (component B) and emulsion ABS (introduced via component E) show particularly balanced combinations of properties here.

What is claimed is:

1. Thermoplastic moulding compositions based on polycarbonate and/or polyester-carbonate comprising graft polymer prepared by means of bulk, solution or bulk-suspension polymerization processes and phosphorus compounds of the general formula (I)

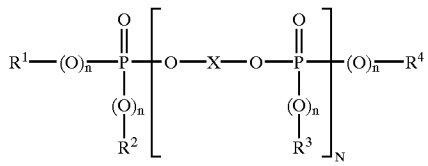

wherein
$R^1$, $R^2$, $R^3$ and $R^4$ independently of one another each denote optionally halogenated $C_1$- to $C_8$-alkyl, or $C_5$- to $C_6$-cycloalkyl, $C_6$- to $C_{20}$-aryl or $C_7$- to $C_{12}$-aralkyl, in each case optionally substituted by halogen and/or alkyl,
n independently of one another denote 0 or 1
N denotes 0 to 30 and
X denotes a mono- or polynuclear aromatic radical having 6 to 30 C atoms, and
0.05 to 5 parts by wt. fluorinated polyolefin.

2. Thermoplastic moulding compositions comprising
A. 40 to 99 parts by wt. thermoplastic polycarbonate and/or polyester-carbonate,
B. 0.5 to 60 parts by wt. graft polymer, prepared by means of bulk, solution or bulk-suspension polymerization processes, of
B.1 50 to 99 wt. % of one or more vinyl monomers on
B.2 50 to 1 wt. % of one or more rubber graft bases with a glass transition temperature of <10° C.,
C. 0 to 45 parts by wt. thermoplastic vinyl copolymer and/or polyalkylene terephthalate,
D. 0.5 to 20 parts by wt. of a phosphorus compound of the formula (I)

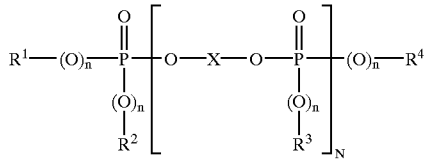

wherein
$R^1$, $R^2$, $R^3$ and $R^4$ independently of one another each denote optionally halogenated $C_1$- to $C_8$-alkyl, or $C_5$- to $C_6$-cycloalkyl, $C_6$- to $C_{20}$-aryl or $C_7$- to $C_{12}$-aralkyl, in each case optionally substituted by halogen and/or alkyl,
n independently of one another denote 0 or 1
N denotes 0 to 30 and
X denotes a mono- or polynuclear aromatic radical having 6 to 30 C atoms, and
E. 0.05 to 5 parts by wt. fluorinated polyolefin.

3. Moulding compositions according to claim 1 which comprise 60 to 98.5 parts by wt. aromatic polycarbonate and/or polyester-carbonate.

4. Moulding compositions according to claim 2 which comprise 1 to 40 parts by wt. component B and 0 to 30 parts by wt. component C.

5. Moulding compositions according to claim 1 which comprise 1 to 18 parts by wt. phosphorus compound according to formula (I).

6. Moulding compositions according to claim 5, which comprises 8.5 to 17 parts by wt. Phosphorus compound according to formula (I).

7. Moulding compositions according to claim 2 wherein the rubber content of component B is 5 wt. % to 25 wt. %.

8. Moulding compositions according to claim 2 wherein vinyl monomers B.1 are mixtures of
B.1.1 styrene, α-methylstyrene, styrenes substituted on the nucleus by halogen or alkyl and/or (meth)acrylic acid $C_1$–$C_8$-alkyl esters and
B.1.2 unsaturated nitriles, (meth)acrylic acid $C_1$–$C_8$-alkyl esters and/or derivatives of unsaturated carboxylic acids.

9. Moulding compositions according to claim 2 wherein graft base B.2 is at least one rubber selected from the group consisting of diene rubbers, EP(D)M rubbers and acrylate, polyurethane, silicone, chloroprene and ethylene/vinyl acetate rubber.

10. Moulding compositions according to claim 2 which comprise as component B bulk graft polymers and emulsion graft polymers.

11. Moulding compositions according to claim 2 which comprise as component D 10 to 90 wt. % of at least one monophosphate compound of the formula (I) and 90 to 10 wt. % relative to the total amount of the phosphorus compounds of at least one oligophosphorus compound of the formula (I).

12. Moulding compositions according to claim 1 wherein in formula (I) N has an average value of 0.3 to 20.

13. Moulding compositions according to claim 1 wherein phosphorous compound of the formula (I) is at least one member selected from the group consisting of tributyl phosphate, tris-(2-chloroethyl) phosphate, tris-(2,3-dibromopropyl) phosphate, triphenyl phosphate, tricresyl phosphate, diphenyl cresyl phosphate, diphenyl octyl phosphate, diphenyl 2-ethylcresyl phosphate, tri-(isopropylphenyl) phosphate, halogen-substituted aryl phosphates, methylphosphonic acid dimethyl ester, methylphosphonic acid diphenyl ester, phenylphosphonic acid diethyl ester, triphenylphosphine oxide and tricresylphosphine oxide.

14. Moulding compositions according to claim 1 wherein phosphorous compound is m-phenylene-bis(diphenyl phosphate).

15. Moulding compositions according to claim 2 wherein component D is a phosphorus compound of the formula (Ia)

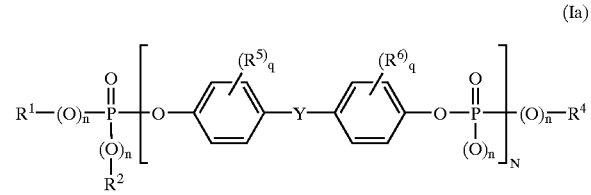

wherein
$R^5$ and $R^6$ independently of one another denote $C_1$–$C_4$ or halogen,
q represents 0, 1 or 2 and
Y denotes $C_1$–$C_7$-alkylidene, $C_1$–$C_7$-alkylene, $C_5$–$C_{12}$-cycloalkylene, $C_5$–$C_{12}$-cycloalkylidene, —O—, —S—, —SO—, —$SO_2$— or —CO—.

16. Moulding compositions according to claim 2 which further comprise up to 35 wt. %, based on the total moulding composition, of at least one flameproofing agent which differs from component D.

17. Moulding compositions according to claim 1 further comprising a very finely divided compound of main groups 1 to 5 or sub-groups 1 to 8 of the periodic table with at least one element chosen from the group consisting of oxygen, sulphur, boron, carbon, phosphorus, nitrogen, hydrogen and silicon.

18. Moulding compositions according to claim 1 which further comprise at least one additive from the group consisting of stabilizers, pigments, mould release agents, flow auxiliaries and/or antistatics.

19. A method of using the molding composition of claim 1 comprising forming a shaped article by injection molding.

20. The shaped article formed in accordance with the method of claim 19.

* * * * *